Sept. 20, 1966 S. MOSKOWITZ 3,274,549

AUTOMATIC PATTERN RECOGNITION SYSTEM

Filed May 4, 1962 5 Sheets-Sheet 1

INVENTOR.

BY SAUL MOSKOWITZ

OSTROLENK, FABER, GERB & SOFFEN
ATTORNEYS

AUTOMATIC PATTERN RECOGNITION SYSTEM

Filed May 4, 1962 5 Sheets-Sheet 2

INVENTOR.
SAUL MOSKOWITZ
BY
OSTROLENK, FABER, GERB & SOFFEN
ATTORNEYS

Sept. 20, 1966 S. MOSKOWITZ 3,274,549

AUTOMATIC PATTERN RECOGNITION SYSTEM

Filed May 4, 1962 5 Sheets-Sheet 3

INVENTOR.
SAUL MOSKOWITZ

BY

OSTROLENK, FABER, GERB & SOFFEN
ATTORNEYS

AUTOMATIC PATTERN RECOGNITION SYSTEM

Filed May 4, 1962 5 Sheets-Sheet 4

INVENTOR.
SAUL MOSKOWITZ
BY
OSTROLENK, FABER, GERB & SOFFEN
ATTORNEYS

INVENTOR.
SAUL MOSKOWITZ
BY
OSTROLENK, FABER, GERB & SOFFEN
ATTORNEYS 3,274,549

AUTOMATIC PATTERN RECOGNITION SYSTEM

Saul Moskowitz, Brooklyn, N.Y., assignor to Kollsman Instrument Corporation, Elmhurst, N.Y., a corporation of New York Filed May 4, 1962, Ser. No. 192,456
3 Claims. (Cl. 340—146.3)

My invention relates to a novel automatic pattern recognition system, and more specifically relates to a pattern recognition system using a function-ensemble-average concept which is at least partially mechanized through the use of an optical integration system of the type shown in my copending application Serial No. 192,526 filed May 4, 1962, entitled "Optical-Analog Integrator," and assigned to the assignee of the present invention.

Automatic pattern recognition systems are well known to the art, and are normally based on correlation techniques. Thus, a stored image is matched to an observed image in an attempt to recognize the observed image. Such matches are very sensitive to metric distortion, noise, overall intensity fluctuation, and, in the case of terrain recognition, to normal image variations and seasonal and weather variations. Thus, it is always possible with such a system to never achieve a match, even though the proper observed image is observed.

The principle of the present invention utilizes the concept of function-ensemble-average techniques wherein optical-analog integration systems are used in mechanizing the system. The function-ensemble-average concept utilizes averages of various functions over a given intensity distribution (such as a map) to uniquely represent the distribution.

An optical-analog integrating system of the type set forth in my copending application Serial No. 192,526 is then utilized to compute the various averages. This basic system may then be incorporated in a pattern recognition computer which can be used for many different purposes.

By way of example, the system can be used to compute generalized coordinate displacement information; to identify various patterns in a qualitative manner; or serve as the error sensor for a positional or guidance servo loop.

Accordingly, a primary object of this invention is to provide a novel pattern recognition system which eliminates the need for complex digital or analog computers.

Another object of this invention is to provide a novel automatic pattern recognition system which utilizes real time mechanization.

A further object of this invention is to provide a novel pattern recognition system which utilizes no moving parts in the integration circuit, and is capable of high operational reliability.

A further object of this invention is to provide a novel pattern recognition system in which the unique properties of a given pattern are implicitly contained in an optical filter.

These and other objects of my novel invention will be apparent from the following description when taken in connection with the drawings, in which:

FIGURE 1 shows an exploded perspective schematic diagram of an optical integration system.

FIGURE 2 schematically represents the manner in which the system of FIGURE 1 can be used to determine coordinate displacement information.

Figure 4:
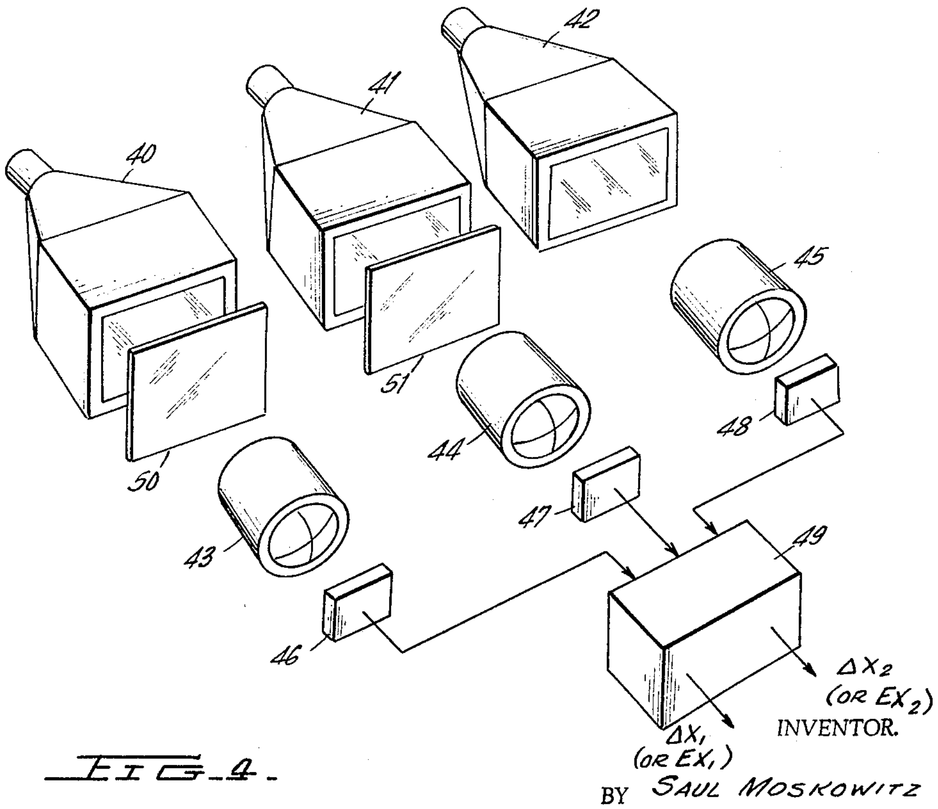
FIGURE 4 illustrates a second embodiment of the integrator circuit of FIGURE 1 when used as an error generator computer for solving a particular equation.
Figure 5:
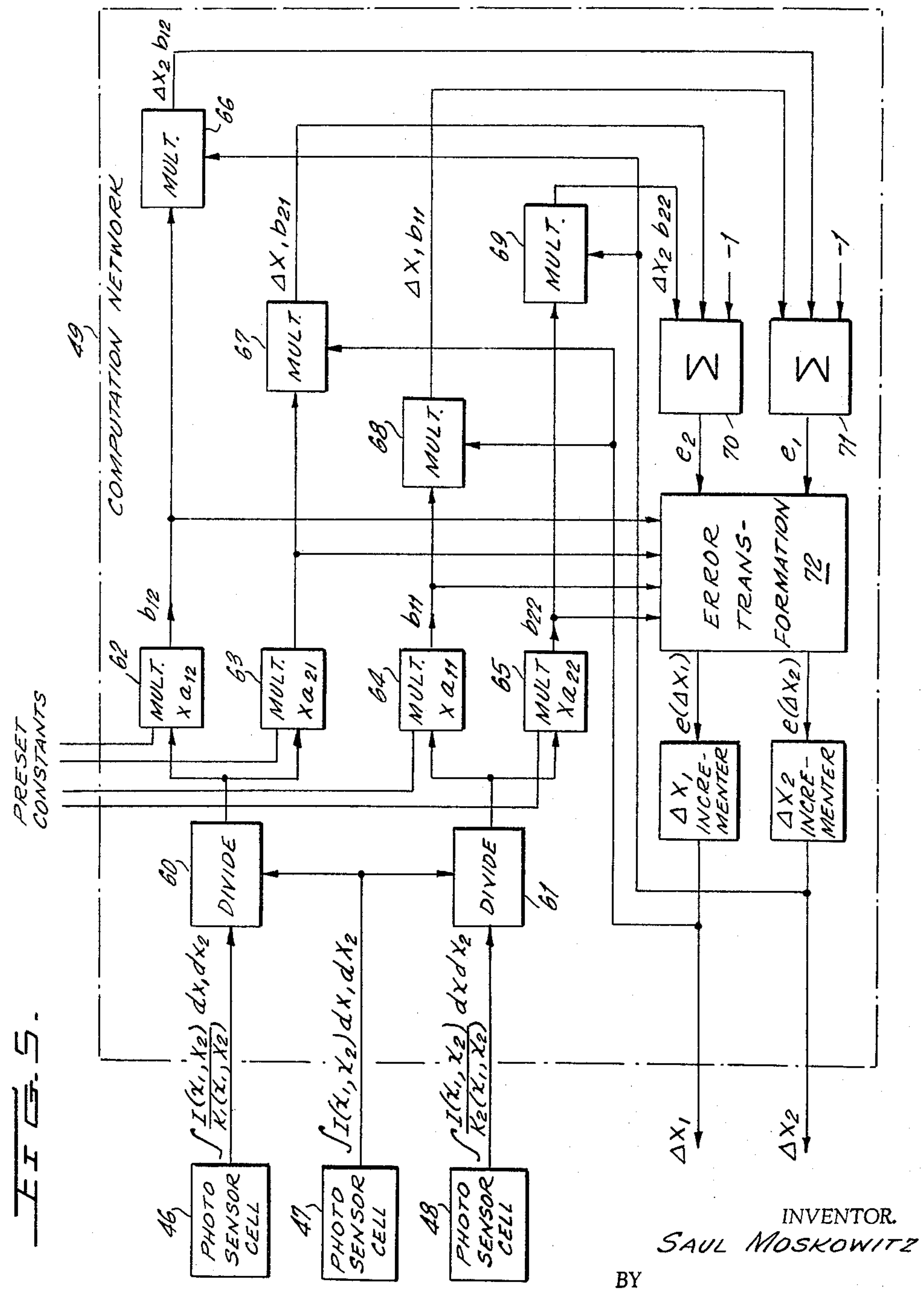

FIGURE 5 schematically repersents the computer system of FIGURE 4 for an implicit displacement computer.

Figure 6:
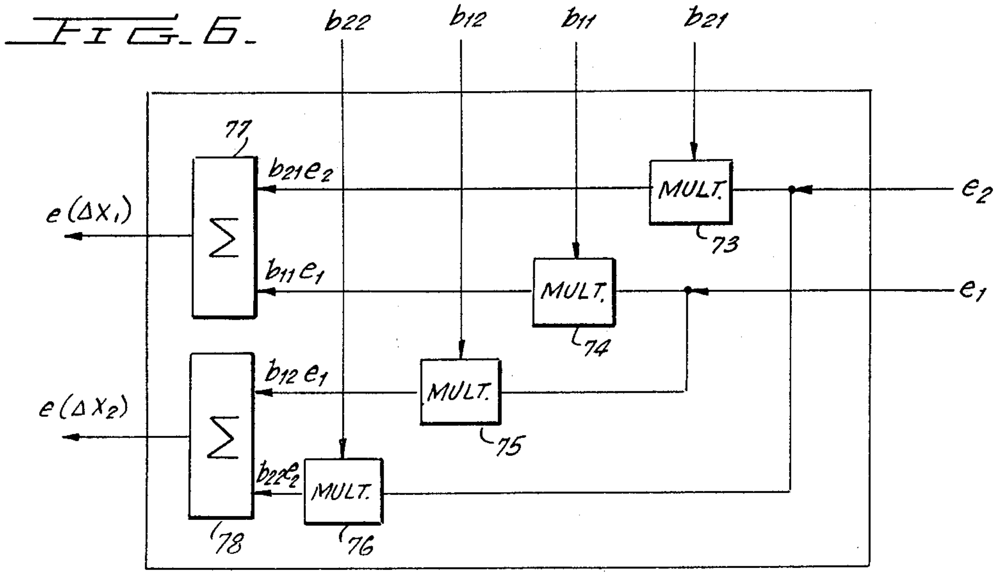

FIGURE 6 schematically represents a detailed circuit system for an error transformation computer.

Figure 7:
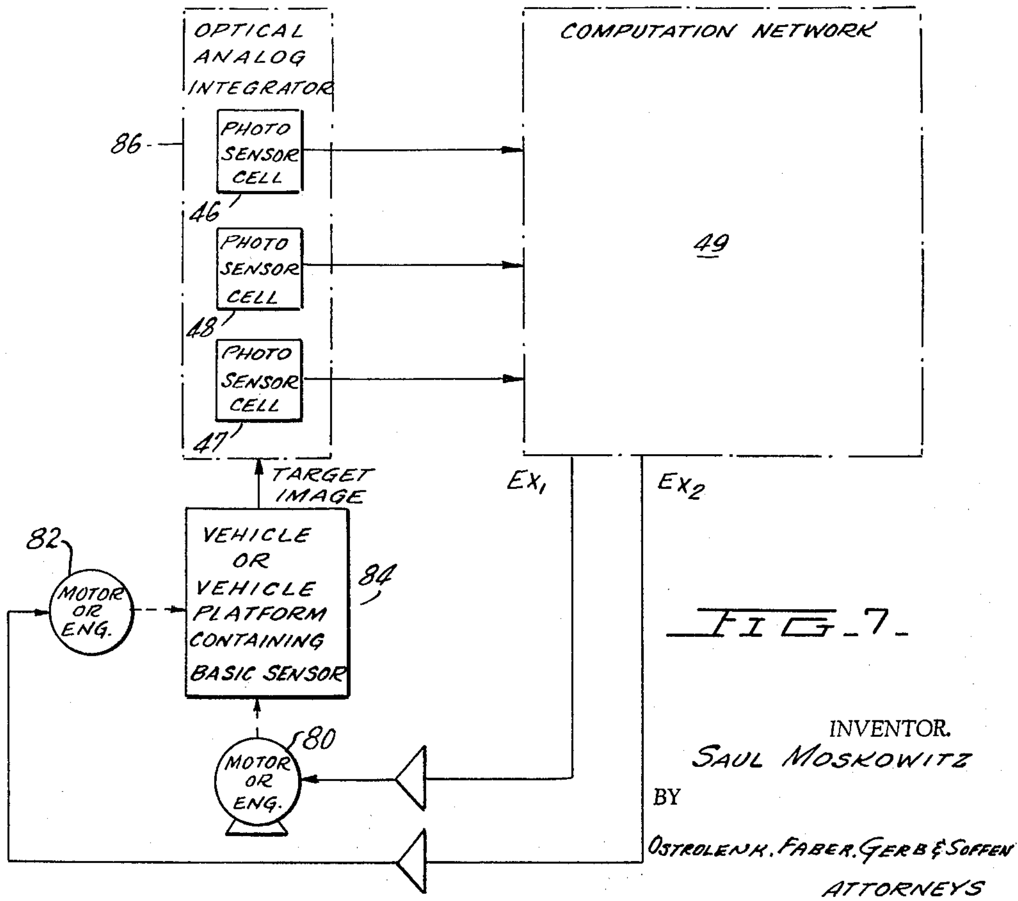

FIGURE 7 shows a block diagram of an implicit error generator or system.

Figure 8:
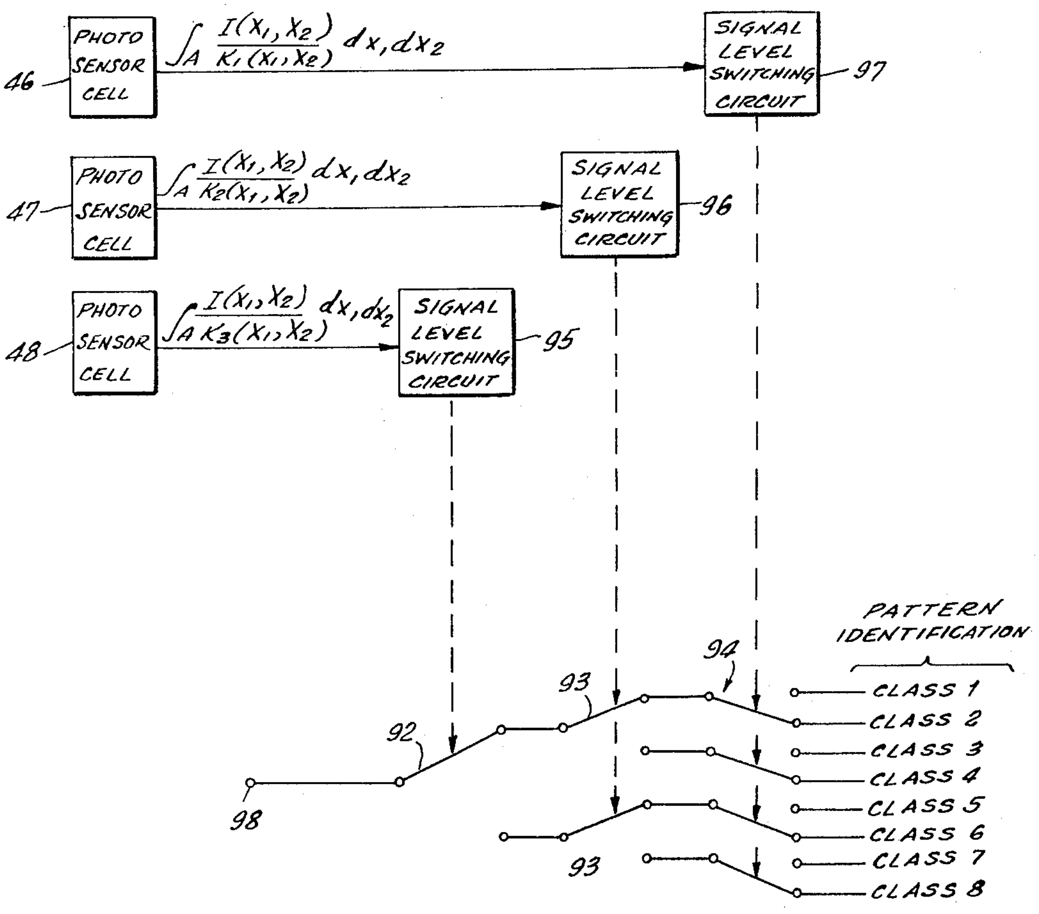

FIGURE 8 schematically represents a logical identification network for pattern identification.

If $x_1$, $x_2$ are the set of coordinates of a particular pattern or map, the intensity distribution function I over a bounded area, A, can be written $$I(x_1, x_2) \qquad (1)$$

The average intensity over the entire region, designated M′ is written $$M' = \int_A I(x_1,x_2)\,dx_1dx_2 \qquad (2)$$

If $gj(x_1, x_2)$ is a particular function, then the ensemble average of this function over area A can be found by multiplying $gj(x_1, x_2)$ times $I(x_1, x_2)$ at each point over the bounded area and takes the form;

$$M^{gj(x_1,x_2)} = \int_A I(x_1,x_2)\,gj(x_1,x_2)\,dx_1dx_2 \qquad (3)$$

It can be shown mathematically that such expressions can form sets which uniquely characterize an intensity distribution (ensemble). Thus, it is possible to identify a given configuration or measure a displacement against a given configuration in terms of such averages.

The system is first described for presentation of coordinate displacement information.

A particular generalized coordinate displacement $\Delta X_k$ can be written, to a given accuracy as a linear combination of particular function averages (or moments);

$$\Delta X_k = \sum_j {}_{kj} M^{gj(x_1,x_2)} \qquad (4)$$

To reduce sensitivity to intensity fluctuations, intensity normalized moments may be used giving $$\Delta x_k = \sum_j a_{kj} \frac{M^{gj(x_1,x_2)}}{M'} \qquad (4')$$

Writing Equation 4′ for purposes of mechanization, $$\Delta X_k = \sum_j a_{kj} \int \frac{\int_A I(x_1,x_2)\,gj(x_1,x_2)\,dx_1dx_2}{\int_A I(x_1,x_2)\,dx_1dx_2} = \frac{1}{\int_A I(x_1,x_2)\,dx_1dx_2} \int_A I(x_1,x_2) \left[ \sum_j a_{kj}{}^{gj(x_1,x_2)} \right] dx_1dx_2 \qquad (5)$$

The $a_{kj}$ and $gj(x_1, x_2)$ are selected and adjusted for a particular configuration. The bracketed expression of Equation 5.

$$\left[ \sum_j a'_{kj}\,gj(x_1,x_2) \right] \qquad (6)$$

is the function which is represented by the optical filter of an optical-analog-integrator, as will be described hereinafter. As described in my copending application Serial No. 192,526, Equation 6 must be rewritten as;

$$\left[ \sum_j a'_{kj}\,gj(x_1,x_2) \right] = C_k \frac{1}{K(x_1,x_2)} + D_k \qquad (7)$$

By inserting Equation 7 into Equation 5, $$\Delta X_k = \frac{C_k}{\int_A I(x_1,x_2)\,dx_1dx_2} \int_A I(x_1,x_2) \frac{1}{K(x_1,x_2)}\,dx_1dx_2 + D_k \qquad (8)$$

A typical example of the manner in which the constant $C_k$ is chosen is as follows:

The constant $D_k$ is defined by the equation $$gj(x_1,x_2) = C_k \left\{ \frac{1}{k(x_1,x_2)} \right\} + D_k$$

where the only restriction on $gj(x_1, x_2)$ is that it remains finite throughout the acceptable region of $x_1$, $x_2$. The quantity $1/k(x_1, x_2)$ can only have values between 0 and 1 if it is to be represented by an optical filter. To indicate how the constants $C_k$ and $D_k$ are chosen, the following numerical example is presented:

Let $gj(x_1, x_2)=x_1x_2$ with the area of interest defined by $$-2\leqslant x_1\leqslant +2$$
$$-2\leqslant x_2\leqslant +2$$

Thus $gj(x_1, x_2)$ can take on values between $-4$ and $+4$. Now $$C_k\left\{\frac{1}{k(x_1,x_2)}\right\}$$

can only be zero or positive for all $x_1x_2$. Arbitrarily select its minimum value to be zero. Then Equation 4 for the minimum value of $gj(x_1, x_2)$ becomes $$-4=0+D_k$$

Thus; $D_k=-4$ (Note that if it had been arbitrairly decided that $$C_k(1/k(x_1, x_2))$$

was to have been $+2$, an engineering decision rather than a theoretical requirement, then $D_k$ would have been $-6$).

The solution for $C_k$ and $k(x_1, x_2)$ is as follows: Equation 4 after the selection of $D_k$ for the function $$gj(x_1, x_2)=x_1x_2$$

can now be written.

$$x_1x_2=C_k\left\{\frac{1}{k(x_1,x_2)}\right\}-4$$

Solving for $1/k(x_1, x_2)$, $$1/k(x_1,x_2)=\frac{x_1x_2+4}{C_k}$$

If $1/k(x_1, x_2)$ is not to exceed the value 1 for the maximum value of $x_1x_2$ which is $+4$, then $$1=\frac{4+4}{Ck}$$

or $C_k=8$

Finally defining the function $k(x_1, x_2)$ as, $$k(x_1,x_2)=\frac{8}{x_1x_2+4}$$

This procedure can be applied similarly to any function of interest.

The index $k$ runs over the number of generalized coordinates involved in the problem.

An implicit mechanization of a function-ensemble-average automatic pattern recognition computer for map matching is formed as follows:

The primary characteristic of such a mechanization is the use of $m$ equations, where $m$ is the limit on the index $k$, each of which contains implicitly all or some of the variables $\Delta X_k$ and all or some of the intensity normalized moments $$M^{gi(x_1,x_2)}M'$$

They form sets of equations $$f_1(\Delta X_k, M^{gi(x_1,x_2)}/M')=O \text{ where} \qquad (9)$$
$$1=1, 2, \ldots, m$$

The nature of the optical-analog-integrator requires the normalized moments to be written, $$M^{gj(x_1,x_2)}/M'=\frac{C_j}{\int_A I(x_1,x_2)dx_1dx_2}\int_A\frac{I(x_1,x_2)}{k_j(x_1,x_2)}dx_1dx_2+D_j \qquad (10)$$

The exact form of the equations (9) is dependent upon the particular intensity distribution considered. The primary advantage of this mechanization with respect to the explicit approach is the possibility of greater accuracy. The physical structure to be used to compute Equation 10 will be shown later.

Where the system is to be used for pattern identification, for a given pattern class the ensemble averages of particular functions are of significant magnitude while for other pattern classes other functions are significant. Let there be a group of functions whose ensemble averages uniquely define a pattern class. If these functions are designated $g_j(x_i)$ where $i$ is the index over the dimension $n$ of the pattern and $j$ the index over the number K of the significant functions, then a quantity Q can be written $$Q=\sum_j\int_A I(x_i)\left(\sum_j g_j(x_i)\right)dx_i \qquad (11)$$

Q is thus a measure of $I(x_i)$ being the desired pattern. Depending upon the size of Q an appropriate factor of confidence can be assigned to the identification. For purposes of mechanization, Equation 11 should be rewritten interchanging the order of integration and summation, $$Q=\int_A I(x_i)\left(\sum_j g_j(x_i)\right)dx_i \qquad (12)$$

Another approach to pattern identification is the logical sequence approach which can be considered to fall in the class of implicit mechanization. Identification is achieved by a series of decisions or choices each dependent on the value obtained for each previous particular function average. Let there be a set of averages, $$M^{gj(x_i)}=\int_A I(x_i)g_j(x_i)dx_i \qquad (13)$$

Considered in order, the value of each $M^{g_j(x_i)}$ determines the interpretation of each subsequent $M^{g_j(x_i)}$, thus, a logical network or path is built up, the final form of the path establishing an identification. A typical structure for mechanizing Equation 13 will be given hereinafter.

For purposes of incorporating the novel system in a servo loop, as an error signal generator, one wants the error signal to approach zero monotonically as the viewing window approaches the desired target. Rather than express displacement as a function of the observed function averages, an expression in terms of function average differences is required. By a choice of appropriate constants, the readout signal (now used as an error signal) can be made to approach zero as the displacement approaches zero.

In this embodiment, a particular generalized coordinate displacement error signal $Ex_K$ can be written as a linear combination of the differences between particular normalized moments; observed and reference. Let the subscript (o) designate the moment for the desired area of match. Then, $$Ex_K=\sum_j a_{Kj}\left(\frac{M^{gj(x_1,x_2)}}{M'}-\frac{M_o^{gj(x_1,x_2)}}{M'_o}\right) \qquad (14)$$

Interchanging the order of summation and integration, $$Ex_K=$$
$$\frac{1}{\int_A I(x_1, d_2)dx_1dx_2}\int_A I(x_1, x_2)\left[\sum_j aK_{\cdot}^{g_j(x_1,x_2)}\right]dx_1,\ dx_2-\frac{1}{\int_{A_o}I_o(x_1, x_2)dx_1dx_2}\int_{A_o}I_o(x_1, x_2)\left[\sum_j aK_j^{g_j(x_1,x_2)}\right]dx_1dx_2. \qquad (15)$$

Using Equation 7

$$Ex_K=\frac{C_K}{\int_A I(x_1, x_2)dx_1dx}\int_A\frac{I(x_1, x_2)}{K(x_1, x_2)}dx_1dx_2+D_K-\frac{C_K}{\int_{A_o}I_o(x_1, x_2)dx_1dx_2}\int_{A_o}\frac{I_o(x_1, x_2)^{dx_1dx_2}}{K(x_1, x_2)}-D_K=$$
$$\frac{C_K}{\int_A I(x_1, x_2)dx_1dx_2}\int_A\frac{I(x_1, x_2)}{K(x_1, x_2)}dx_1dx_2-E_K \qquad (16)$$

Notice the similarity of Equation 16 to Equation 8. The main difference, which is quite significant is that Equation 14, rather than Equation 16 itself, is used to evaluate the constants for a particular matching region. The appearance of the mechanization is identical in Equation 16 and Equation 8. However, the principle of operation is quite different.

Again, as with problems of the type involved in deriving Equation 9, a set of M equations in the variables $Ex_K$ and the intensity normalized moment differences $$(M^{g_j(x_1,x_2)}/M' - M_o^{g_j(x_1,x_2)}/M'_o) f_1(Ex_K, M^{g_j(x_1,x_2)}/M' - M_o^{g_j(x_1,x_2)}/M'_o) = 0 \quad (17)$$

where 1=1, 2, . . . , M can be used for purposes of obtaining an implicit rather than an explicit mechanization. The nature of the optical-analog-integrator requires that the normalized moment differences be written $$\frac{M^{g_j(x_1,x_2)}}{M'} - \frac{M_o^{g_j(x_1,x_2)}}{M_o'} = \frac{C_j}{\int_A I(x_1, x_2)dx_1dx_2} \frac{I(x_1, x_2)}{\int_A k_j(x_1, x_2)dx_1dx_2 - E_j} \quad (18)$$

Notice the similarity between Equation 18 and Equation 10. The difference lies in the method used to pre-evaluate the constants which appear in the equation of mechanization, Equation 17. The exact form of Equations 17 is dependent upon the particular intensity distribution considered.

Figure 1:
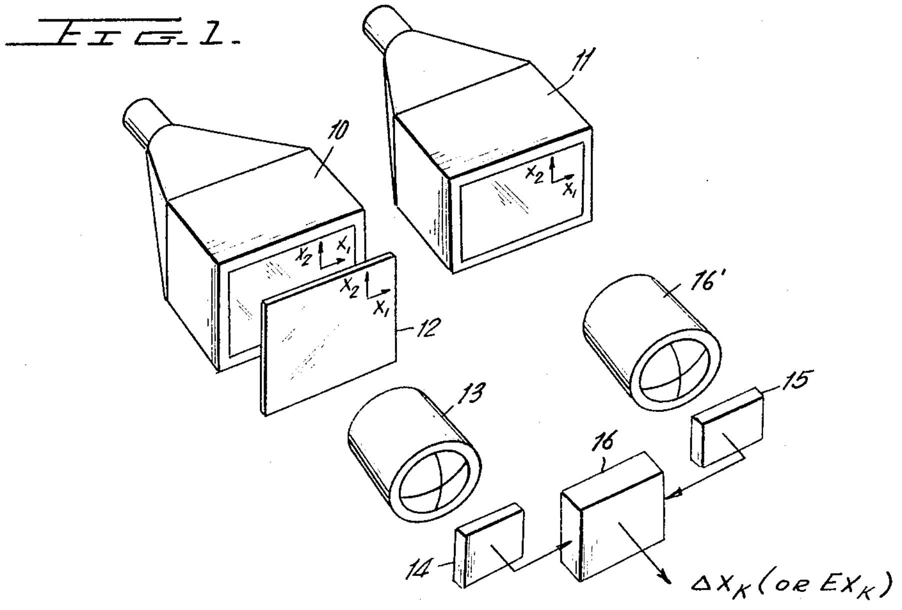
Figure 2:
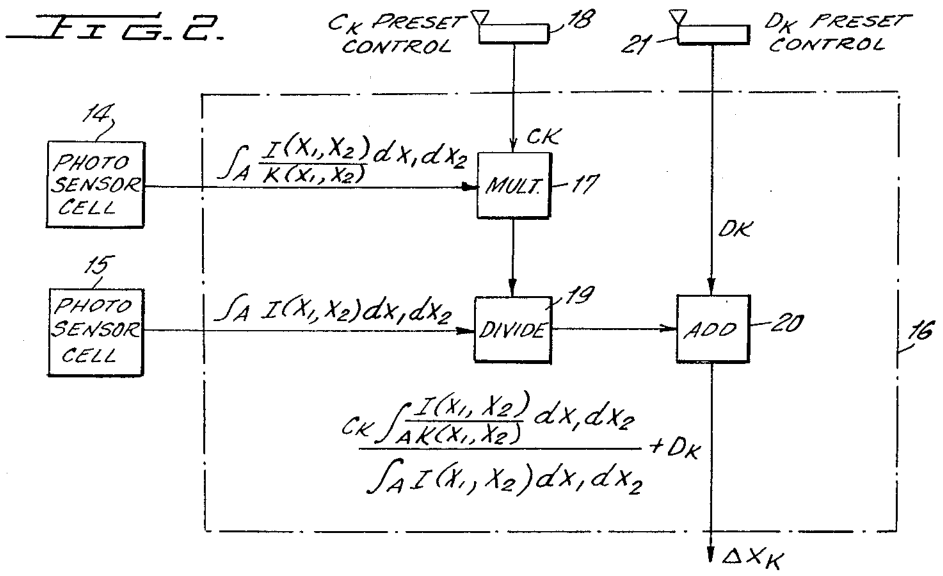

FIGURES 1 and 2 illustrate the manner in which Equation 8 can be solved where the device is used to generate displacement coordinate information. An image derived in any desired manner is displayed on two cathode ray tubes 10 and 11, or their equivalent, with an optical filter 12 representing the function $1/k(x_1x_2)$ in front of the first tube 10. It is to be noted that it is also possible to use only one image display means, and insert the filter 12 and perform the calculations sequentially. Thus, the intensity distribution $I(x_1, x_2)$ of the primary image source 10 is multiplied by the functional filter to yield the product $I(x_1, x_2)/k(x_1, x_2)$. A condensing lens system 13 focuses this spacial intensity distribution upon the photosensor cell 14 which, because it "measures" the total energy incident upon itself, effectively integrates the particular spacial intensity distribution. The same intensity distribution $I(x_1, x_2)$ displayed by the secondary image source 11 is focused, unfiltered, upon the photosensor cell 15 by another condensing lens system 16' (or sequentially by the same condensing lens system 13 on the photosensor cell 14).

The outputs of the photosensor cells 14 and 15 are connected to the computation network 16 detailed in FIGURE 2. Referring to FIGURE 2, the output of photosensor cell 14, which corresponds to the unnormalized function-ensemble average, is multiplied by the preset constant $C_K$ in multiplier 17 connected to function generator 18 which generates $C_K$. The output of multiplier 17 is then divided by the output of the photosensor cell 15, which is the normalization integral in divider 19. To this quantity is added the preset constant $D_K$ to yield the desired output $\Delta x_K$ by connecting the output of divider 19 to adder 20 which receives constant $D_K$ from generator 21.

Figure 3:
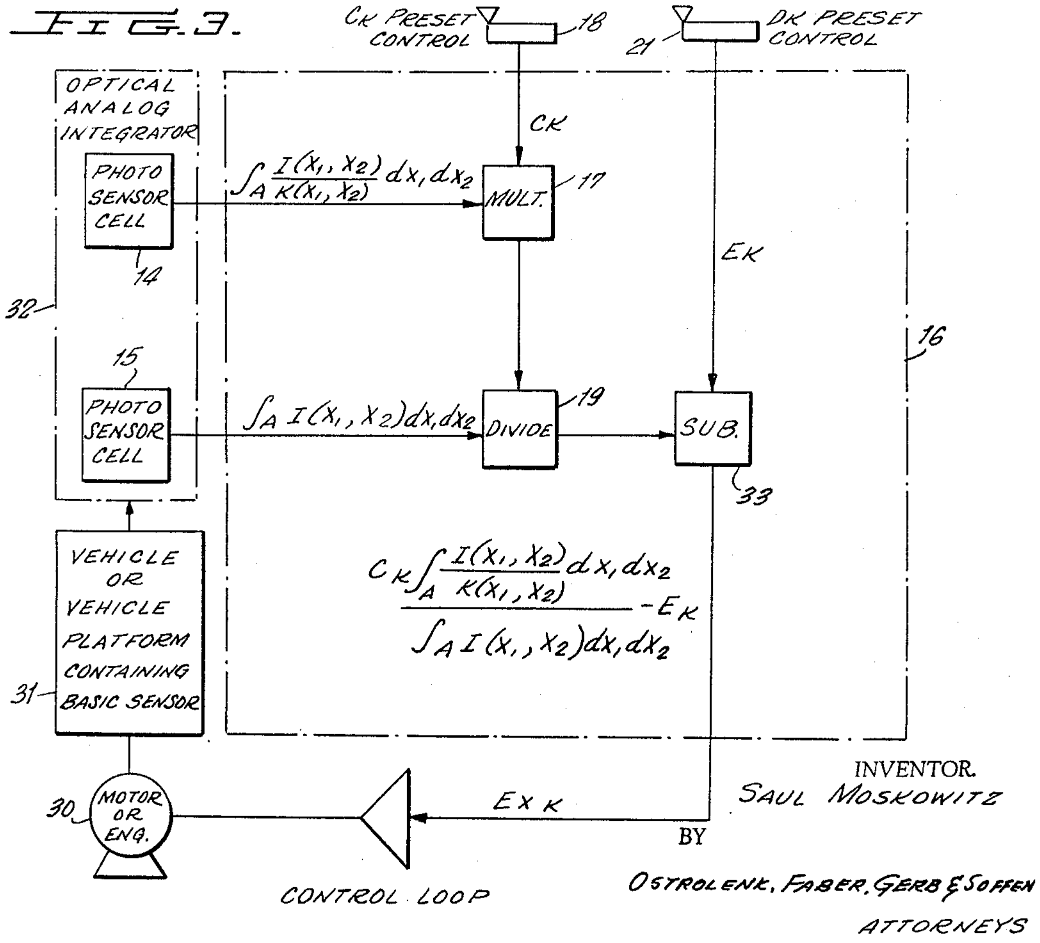
FIGURE 3 illustrates the manner in which the system of FIGURE 1 can be used in an error generator system.

The front end of the explicit error generator computer is also shown in FIGURE 1. However, the computation network required to instrument Equation 16 is shown in FIGURE 3. Referring to FIGURE 3, the output is not $\Delta x_K$ but rather $Ex_K$ which is a servo error signal. This signal may be used to energize a control motor or engine 30 which can drive a vehicle or vehicle platform 31 upon which the sensor front end 32 is mounted, so as to achieve a null. The significant difference between the instrumentations shown in FIGURES 2 and 3 is the method of precomputation, the meaning of the constants $C_K$, $D_K$, and $E_K$, and a subtractor 33 in place of adder 20 of FIGURE 2.

FIGURE 4 shows a mechanical schematic representation of either the implicit displacement computer or the implicit error generator computer as would be used for a particular problem. In FIGURE 4, there are three image sources 40, 41 and 42 which cooperate with condensing optical systems 43, 44 and 45 respectively, and integrating photosensor cells 46, 47 and 48 respectively. The outputs of cells 46, 47 and 48 are appropriately combined in computer network 49, as will be described.

The outputs of sources 40 and 41 are altered by filters 50 and 57 respectively which represent the functions $$\frac{1}{K_1(x_1, x_2)} \text{ and } \frac{1}{K_2(x_1, x_2)}$$

respectively. For the problem chosen for illustrative purposes Equations 9 are reduced to two equations in the two unknowns $\Delta x_1$ and $\Delta x_2$ (or $Ex_1$ and $Ex_2$).

$$\Delta x_1 b_{11} + \Delta x_2 b_{12} - 1 = 0 = e_1 \quad (19)$$

$$\Delta x_1 b_{21} + \Delta x_2 b_{22} - 1 = 0 = e_2 \quad (20)$$

where $$b_{11} = a_{11} \frac{1}{\int_A I(x_1, x_2)dx_1dx_2} \int_A \frac{I(x_1, x_2)}{K_2(x_1, x_2)} dx_1dx_2 \quad (21)$$

$$b_{21} = a_{21} \frac{1}{\int_A I(x_1, x_2)dx_1dx_2} \int_A \frac{I(x_1, x_2)}{K_1(x_1, x_2)} dx_1dx_2 \quad (22)$$

$$b_{12} = a_{12} \frac{1}{\int_A I(x_1,x_2)dx_1dx_2} \int_A \frac{I(x_1,x_2)}{K_1(x_1,x_2)} dx_1dx_2 \quad (23)$$

$$b_{22} = a_{22} \frac{1}{\int_A I(x_1,x_2)dx_1dx_2} \int_A \frac{I(x_1,x_2)}{K_2(x_1,x_2)} dx_1dx_2 \quad (24)$$

The constants $a_{11}$, $a_{12}$, $a_{21}$, $a_{22}$ and the functions $$K_1(x_1, x_2), K_2(x_1, x_2)$$

are appropriately chosen and evaluated for the given problem. Mechanizations of equations more complicated than Equations 19 and 20 but in the same form are also covered by this invention.

A schematic representation of the computation network for the implicit displacement computer of FIGURE 4 is shown in FIGURE 5. The outputs of the photosensor cells 46 and 48 (the function-ensemble-averages of $$1/K_1(x_1, x_2)$$

and $1/K_2(x_1, x_2)$) are divided in dividers 60 and 61, respectively, by the output of photosensor cell 47 which is the normalization integral. These quantities are multiplied by the appropriate preset constants $a_{11}$, $a_{12}$, $a_{21}$, and $a_{22}$ in multipliers 62, 63, 64 and 65 to yield the quantities $b_{11}$, $b_{12}$, $b_{21}$, and $b_{22}$. The implicity (closed loop) determined outputs $\Delta x_1$ and $\Delta x_2$ are used to multiply the proper $b_{ij}$ in multipliers 66, 67, 68 and 69, and these quantities summed with the constant −1 in subtractors 70 and 71 to yield computer servo loop error signals $e_1$ and $e_2$. These error signals are transformed in error transformation system 72 by means of the transported $b_{ij}$ matrix into errors in the variables, $e(\Delta x_1)$ and $e(\Delta x_2)$. These values are used to increment $\Delta x_1$ and $\Delta x_2$. Theoretically, the inverse $b_{ij}$ matrix should be used. However, for all practical purposes the above approach is satisfactory. Details of the mechanization of the error transformation are shown in FIGURE 6 as shown including multipliers 73, 74, 75 and 76 and adders 77 and 78.

The computation network of the implicit error generator appears identical in form to that of the implicit displacement computer. Again it is the method used to evaluate the constants for a given problem and the use of the output signals that are appreciably different. The block diagram of FIGURE 7 illustrates this. The output error signal $Ex_1$ and $Ex_2$ are used as control signals for vehicle motors or engines 80 and 82 respectively of vehicle platform 84 which contains the basic sensing (viewing) system 86.

When the system is mechanized for pattern identification, a quantitative signal is not required. Rather, various patterns, independent of their relative orientation or position, must be distinguished, one from the other. Mechanization of Equation 12 is easily accomplished by means of a single filter placed in front of the image source, as in FIGURE 1 but without a secondary image source. The output of photosensor 14 is used as a direct measure of the identification. Such a system is only useful for identifying one particular pattern. For different patterns different filters 12 are required.

It is possible by means of a logical network or networks to be able to identify different patterns or classes of patterns with a single mechanization. FIGURE 8 is a schematic representation of such a logical network which is shown for purposes of illustration as a means for distinguishing between eight different classes of patterns based upon information obtained from three optical integrator systems. If a third filter is placed in front of the "C" image source of FIGURE 4, then FIGURE 4 is an appropriate mechanical schematic representation of this computer. The logical identification network of FIGURE 8 replaces the computation network of FIGURE 4. The magnitude of the signal from each photosensor cell 46, 47 and 48 is used to actuate the various signal switches 92, 93 and 94 respectively through energizing circuits 95, 96 and 97 respectively. Two position switches for switches 92, 93 and 94 are shown, although it is possible to have three or more position switches actuated by various levels of each photosensor cell signal. With the scheme presented, many fewer optical-analog integrator systems are required than the number of different pattern classes to be identified where a particular pattern is selected by appropriate circuit means connected from terminal to terminals labeled "Class 1 through Class 8."

Although I have described preferred embodiments of my novel invention, many variations and modifications will now be obvious to those skilled in the art, and I prefer to be limited, therefore, not by the specific disclosure herein, but only by the appended claims.

I claim:

1. A pattern recognition system; said pattern recognition system comprising first and second and third image producing means for producing an image of a common object to be identified, first, second and third transducer means for receiving the radiant energy across the full area of said first, second and third images respectively, filter means for partially absorbing a predetermined portion of the energy of said first and second image interposed between said first and second image and said first and second transducer means, and computation network means for computing pattern information from the outputs of said first, second and third transducers; the output of said first cell being related to $$\int_A \frac{I(x_1, x_2)}{K_1(x_1, x_2)} dx_1 dx_2$$

wherein $I(x_1, x_2)$ is a variable intensity distribution over the area A and $K_1(x_1, x_2)$ is a function of variables $x_1$ and $x_2$ over the area A the output of said second cell being related to $$\int_A \frac{I(x_1, x_2)}{K_2(x_1, x_2)} dx_1 dx_2$$

wherein $K_2(x_1 x_2)$ is a second function of variables $x_1$, $x_2$ over the area A the output of said third cell being related to $$\int_A I(x_1, x_2) dx_1 dx_2$$

said computer being operable to compute the implicit displacement information $\Delta x_1$, and $\Delta x_2$ of said pattern from a predetermined value.

2. A pattern recognition system; said pattern recognition system comprising first and second and third image producing means for producing an image of a common object to be identified, first, second and third transducer means for receiving the radiant energy across the full area of said first, second and third images respectively, filter means for partially absorbing a predetermined portion of the energy of said first and second image interposed between said first and second image and said first and second transducer means, and computation network means for computing pattern information from the outputs of said first, second and third transducers; the output of said first cell being related to $$\int_A \frac{I(x_1 x_2)}{K_1(x_1 x_2)} dx_1 dx_2$$

wherein $I(x_1, x_2)$ is a variable intensity distribution over the area A and $K_1(x_1, x_2)$ is a function of variables $x_1$ and $x_2$ over the area A the output of said second cell being related to $$\int_A \frac{I(x_1, x_2)}{K_2(x_1, x_2)} dx_1 dx_2$$

wherein $K_2(x_1 x_2)$ is a second function of variables $x_1$, $x_2$ over the area A the output of said third cell being related to $$\int_A I(x_1, x_2) dx_1 dx_2$$

said computer being operable to compute servo loop error signal $e_1$ and $e_2$ from said outputs of said first, second and third cells.

3. A pattern recognition system; said pattern recognition system comprising first and second and third image producing means for producing an image of a common object to be identified, first, second and third transducer means for receiving the radiant energy across the full area of said first, second and third images respectively, filter means for partially absorbing a predetermined portion of the energy of said first and second image interposed between said first and second image and said first and second transducer means, and computation network means for computing pattern information from the outputs of said first, second and third transducers; the output of said first cell being related to $$\int_A \frac{I(x_1, x_2)}{K_1(x_1, x_2)} dx_1 dx_2$$

wherein $I(x_1, x_2)$ is a variable intensity distribution over the area A and $K_1(x_1, x_2)$ is a function of variables $x_1$ and $x_2$ over the area A the output of said second cell being related to $$\int_A \frac{I(x_1, x_2)}{K_2(x_1, x_2)} dx_1 dx_2$$

wherein $K_2(x_1 x_2)$ is a second function of variables $x_1$, $x_2$ over the area A the output of said third cell being related to $$\int_A I(x_1, x_2) dx_1 dx_2$$

said outputs of said first, second and third cells being connected to respective switching circuits, respectively, operable at a selected signal level; said first switching circuit including a first movable contact; said second switching circuit including second and third movable contact means; only one of said second and third movable contacts being connectable in series with said first movable contact at one time; said third switching circuit including a plurality of movable contacts selectively connectable in series with said second and third contacts whereby, depending upon the output of said first, second, and third cells, only one of said plurality of movable contacts is connected to said first movable contact through one of said second or third contacts; each of said plurality of movable contacts being connected to a respective pattern class identifying circuit.

(References on following page)

References Cited by the Examiner

UNITED STATES PATENTS

| | | | |
|---|---|---|---|
| 2,857,798 | 10/1958 | Seliger | 340—190 X |
| 2,964,644 | 12/1960 | Hobrough. | |
| 3,004,464 | 10/1961 | Leighton et al. | |
| 3,064,519 | 11/1962 | Shelton. | |
| 3,089,917 | 5/1963 | Fernicola | 178—6.5 |
| 3,111,666 | 11/1963 | Wilmotte | 235—181 X |
| 3,144,554 | 8/1964 | Whitney | 250—83.3 |

MALCOLM A. MORRISON, *Primary Examiner.*

I. KESCHNER, K. DOBYNS, *Assistant Examiners.*